(12) United States Patent
Sugie et al.

(10) Patent No.: US 6,630,119 B1
(45) Date of Patent: Oct. 7, 2003

(54) HYDROGEN GAS GENERATING METHOD

(76) Inventors: Yosohiro Sugie, 817-4, Kuchiri, Onoe-cho, Kakogawa-shi, Hyogo 675-0022 (JP); Kenzo Kimura, c/o Nichirin Co., Ltd. 1118, Sazuchi, Bessho-cho, Himeji-shi, Hyogo 671-0224 (JP)

( * ) Notice: Subject to any disclaimer, the term of this patent is extended or adjusted under 35 U.S.C. 154(b) by 0 days.

(21) Appl. No.: 09/831,017
(22) PCT Filed: May 15, 2000
(86) PCT No.: PCT/JP00/03100
§ 371 (c)(1), (2), (4) Date: May 3, 2001
(87) PCT Pub. No.: WO01/87769
PCT Pub. Date: Nov. 22, 2001

(51) Int. Cl.$^7$ .................................................. C01B 3/04
(52) U.S. Cl. .................................................... 423/658.2
(58) Field of Search ...................................... 423/658.2

(56) References Cited

U.S. PATENT DOCUMENTS

| | | |
|---|---|---|
| 3,674,666 A | 7/1972 | Foster et al. |
| 3,963,830 A | 6/1976 | Kasai et al. |
| 3,995,016 A | 11/1976 | Kittle |
| 4,079,120 A | 3/1978 | Cole et al. |
| 4,197,386 A | 4/1980 | Schoen |
| 4,277,316 A | 7/1981 | Tayler |
| 4,278,650 A | 7/1981 | Dorrance |
| 4,304,755 A | 12/1981 | Thome et al. |
| 5,397,447 A | 3/1995 | Rolison et al. |

FOREIGN PATENT DOCUMENTS

| | | |
|---|---|---|
| EP | 1006078 | * 6/2000 |
| FR | 2 302 274 | 9/1976 |
| JP | 58055302 | 4/1983 |
| JP | 58055303 | 4/1983 |
| JP | 58135103 | 8/1983 |
| JP | 60251101 | 12/1985 |
| JP | 01179701 | 7/1989 |
| JP | 04059601 | 2/1992 |
| JP | 10212101 | 8/1998 |
| JP | 10263397 | 10/1998 |
| JP | 10310402 | 11/1998 |
| JP | 11171501 | * 6/1999 |

OTHER PUBLICATIONS

Momirlan M et al: "Structure of Zeolites used in Hydrogen Evolution from Water", International Journal of Hydrogen Energy, vol. 22, no, 12, Dec. 1, 1997, pp. 1133–1136.
Chemical Abstracts, vol. 112, No. 24, Jun. 11, 1990 Columbus Ohio, US; abstract No. 219809, Momirlan, Magdalena et al: "Hydrogen Production by Water Decomposition in the Presence of Zeolites Thermally Activated in Vacuum.".
Momirean Magdalena "Hydrogen Generation in Continuous Cyclic Dissociation of Water" Revue Roumaine de Chimie, 37, 9, 1001–1006 (1992). (No month).

* cited by examiner

*Primary Examiner*—Wayne A. Langel
(74) *Attorney, Agent, or Firm*—Merchant & Gould, P.C.

(57) ABSTRACT

Steam generated by heating (80° C.) pure water in a steam generating apparatus 1 is supplied into a reactor vessel 7 through a mass flow 6 from below. The reactor vessel 7 is filled with zeolite 8 which is granulated and to which metal halide is added. A heater 9 is provided around the reactor vessel 7. A conduit 10 is connected to the upper end of the reactor vessel 7. A bypass 11 for collecting a sample, a pressure gauge 12 and a $N_2$ trap 13 are provided in the conduit 10. A suction pump 14 is connected to the $N_2$ trap 13.

6 Claims, 3 Drawing Sheets

HYDROGEN GAS GENERATING METHOD

TECHNICAL FIELD

The present invention relates to a next-generation energy source, in particular, relates to a method for producing hydrogen gas, which is expected to use as fuel for fuel cell, through pyrolysis of water.

BACKGROUND ART

Since only water is generated through combustion of hydrogen, hydrogen has a feature as a high-quality energy source from the viewpoint of the physical and the chemical properties thereof. Hydrogen also attracts an attention as a clean medium with regards to the problems of the environment, and it is expected that hydrogen will increasingly be demanded as an energy source for the future.

However, in our country (Japan), there is not yet completed a hydrogen producing system that is low-cost and has a high efficiency.

As a conventional method for producing hydrogen, there are a method through electrolysis of water and a method through a thermochemical cycle. With regards to the method through electrolysis, the conventional process is improved and a new process is developed to advance the energy efficiency. However, such a method is not considered to be effective in the total balance due to the limit of electric power in our country. With regards to the method through a thermochemical cycle, various methods are proposed and implemented; however, they still have problems as follows:

[Steam Reforming Method]

This is a method of obtaining hydrogen by reacting methane gas and steam which is heated up to 700° C.–800° C.

This method has drawbacks that it requires a high temperature of reaction, generates carbon dioxide which causes the global warming, and requires large-scale facilities.

[Conversion Reaction of Carbon Monoxide]

$$CO+H_2O=CO_2+H_2$$

The above-mentioned conversion reaction is conducted using iron oxide ($Fe_3O_4$) or a catalyst in a group of zinc oxide-copper. Also, M. Laniecki, et al. reports that NaY-type zeolite can be used as a catalyst.

The method using conversion reaction of carbon monoxide has drawbacks that it requires a high temperature of reaction and generates carbon dioxide, too.

[Direct Decomposition of Water Through Triiron Tetroxide ($Fe_3O_4$)]

This method, which was tested by New Energy and Industrial Technology Development Organization (Public Corporation of Japan), comprises eight (8) processes of an iron-steam group, as shown in FIG. 2. This method has drawbacks that it requires a high temperature for producing FeO through deoxidation of $Fe_3O_4$ and that the apparatus thereof is complicated due to the combination of multistage reactions.

[Cycle of Halogen Group]

FIG. 3 shows a cycle for producing hydrogen gas, which is referred to as "UT-3" in Tokyo University. It is comprised of the following multistage reactions:

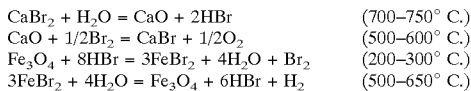

| | |
|---|---|
| $CaBr_2 + H_2O = CaO + 2HBr$ | (700–750° C.) |
| $CaO + 1/2Br_2 = CaBr + 1/2O_2$ | (500–600° C.) |
| $Fe_3O_4 + 8HBr = 3FeBr_2 + 4H_2O + Br_2$ | (200–300° C.) |
| $3FeBr_2 + 4H_2O = Fe_3O_4 + 6HBr + H_2$ | (500–650° C.) |

This method also has drawbacks that it requires a high temperature of reaction and that the apparatus thereof is complicated due to the combination of multistage reactions.

[Iron-Bromine Cycle]

A cycle for producing hydrogen gas is conducted by Osaka National Research Institute(Public Corporation of Japan), using the following equations:

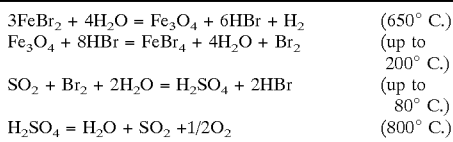

| | |
|---|---|
| $3FeBr_2 + 4H_2O = Fe_3O_4 + 6HBr + H_2$ | (650° C.) |
| $Fe_3O_4 + 8HBr = FeBr_4 + 4H_2O + Br_2$ | (up to 200° C.) |
| $SO_2 + Br_2 + 2H_2O = H_2SO_4 + 2HBr$ | (up to 80° C.) |
| $H_2SO_4 = H_2O + SO_2 + 1/2O_2$ | (800° C.) |

This method also has drawbacks that it requires a high temperature of reaction and that the apparatus thereof is complicated due to the combination of multistage reactions.

[Oxide Cycle]

A cycle for producing hydrogen gas is conducted by Los Alamos National Laboratory, and it is reported that it proceeds up to 40 cycles using the following equations:

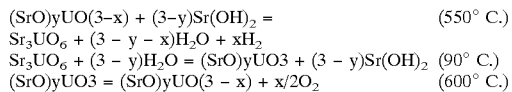

| | |
|---|---|
| $(SrO)yUO(3-x) + (3-y)Sr(OH)_2 = Sr_3UO_6 + (3 - y - x)H_2O + xH_2$ | (550° C.) |
| $Sr_3UO_6 + (3 - y)H_2O = (SrO)yUO3 + (3 - y)Sr(OH)_2$ | (90° C.) |
| $(SrO)yUO3 = (SrO)yUO(3 - x) + x/2O_2$ | (600° C.) |

Since this method uses the complex oxide of strontium and uranium, it is inferior from the viewpoint of natural resources, and also there is fear that it would cause environmental pollution.

[Sulfur Group Cycle]

This is a cycle for producing hydrogen gas by combining the following multistage reactions; however, it is doubtful whether an actual experiment is conducted or not:

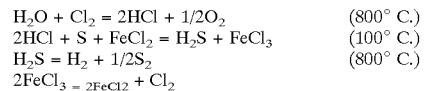

| | |
|---|---|
| $H_2O + Cl_2 = 2HCl + 1/2O_2$ | (800° C.) |
| $2HCl + S + FeCl_2 = H_2S + FeCl_3$ | (100° C.) |
| $H_2S = H_2 + 1/2S_2$ | (800° C.) |
| $2FeCl_3 {}_{= {}_{2FeCl2}} + Cl_2$ | |

As mentioned above, any one of the conventional technologies with relation to producing hydrogen, except for the method through electrolysis, requires a high temperature of reaction, the apparatus thereof is complicated and large-scale due to the combination of multistage reactions, and it generates the reaction product such as $CO_2$ or the like. Therefore, the present inventors have studied a hydrogen gas producing method, is which is low-cost, has a high efficiency, does not generate the reaction product such as $CO_2$ or the like.

According to the oxide cycle by Los Alamos National Laboratory, the production of hydrogen is attempted at the temperature less than or equal to 600° C. by using the complex oxides of strontium and uranium and the pyrolysis reaction between strontium and hydroxide. The present inventors conceived an idea that hydrogen gas can be produced using the oxide cycle with regards to zeolite comprising the complex oxide of silicon and aluminum. As a result, as proposed by PCT international publication No. WO98/51612, hydrogen gas can be produced at a low temperature and through only one stage reaction by conducting direct pyrolysis of water with a zeolite catalyst. However, in the above-mentioned method using a zeolite catalyst, there are cases in which hydrogen gas of high concentration can be produced, however it is still impossible to stably produce hydrogen gas of high concentration.

DISCLOSURE OF THE INVENTION

According to the present invention, there is provided a method for producing hydrogen gas, comprising the steps of: granulating zeolite; applying water to the zeolite at the temperature equal to or greater than 300° C. and less than or equal to 500° C.; and conducting direct pyrolysis of water using the zeolite as a catalyst. The granulation of zeolite enables to stably produce hydrogen gas.

Zeolite is crystalline aluminosilicate, and mainly composed of $SiO_2$, $Al_2O_3$, $H_2O$, $Na_2O$, $K_2O$ and $CaO$. Zeolite has various structures. Also, the chemical composition thereof has variety because the Si/Al ratio in the framework, the ratio of exchange cation, and further the number of water molecules within a unit cell are unstable. Therefore, at the present time, zeolite has 40 kinds or more as a natural mineral, and also 150 kinds or more as synthetic zeolite.

In order to produce hydrogen at high concentration, alkali metal halide and/or alkaline-earth metal halide is/are added to zeolite at the time of granulating the zeolite.

As a halogen element of which the above-mentioned alkali metal halide and/or alkaline-earth metal halide is/are comprised, Cl (chlorine), Br (bromine), F (fluorine) or the like can be listed. Cl is the most effective. It is assumed that the reason why Cl is the most effective is that chloraquo complex can be easily formed with water molecules.

As an alkali metal, Na (sodium), Li (lithium), K (potassium) or the like can be listed. As an alkaline-earth metal, Mg can be listed. Among these, Li is the most effective. The reason is assumed as follows:

Li has the smallest ion radius and it is easy to exchange ions between metals, such as Na, Mg, K or the like, which are included in natural zeolite. As a result of this, the density of the electric charge of zeolite is increased, the dissociation of water is accelerated, the pressure equilibrium constant is made large, and thereby the decomposition of water is accelerated.

Further, it is preferable that the addition rate of alkali metal halide and/or alkaline alkaline-earth metal halide be from 1 to 20g with respect to 100 g of zeolite.

Furthermore, pyrolysis under a depressurized condition improves the yield thereof.

BEST MODE FOR CARRYING OUT THE INVENTION

Figure 1:
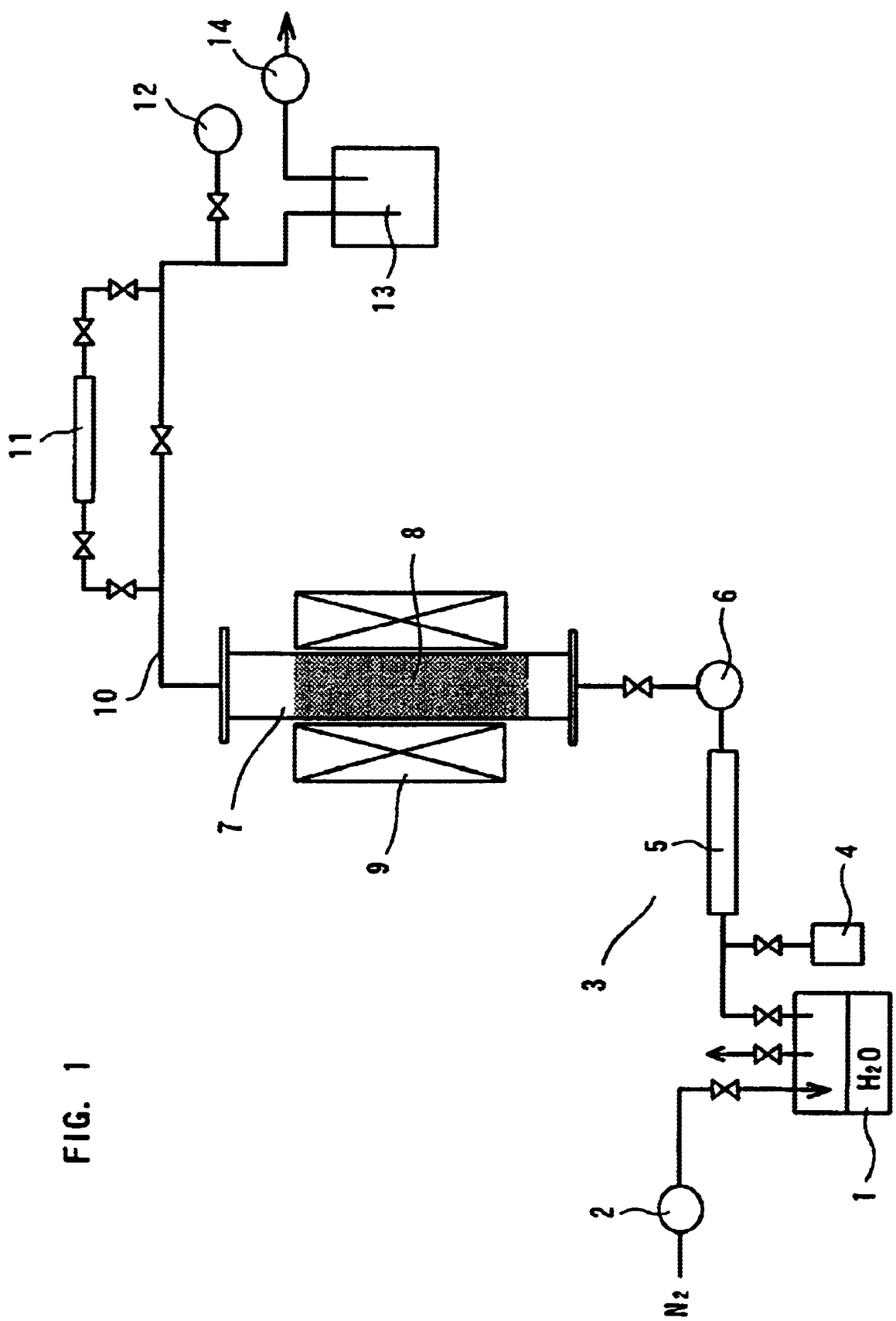
FIG. 1 is a view showing an example of an apparatus for implementing a producing method of hydrogen gas according to the present invention.
Figure 2:
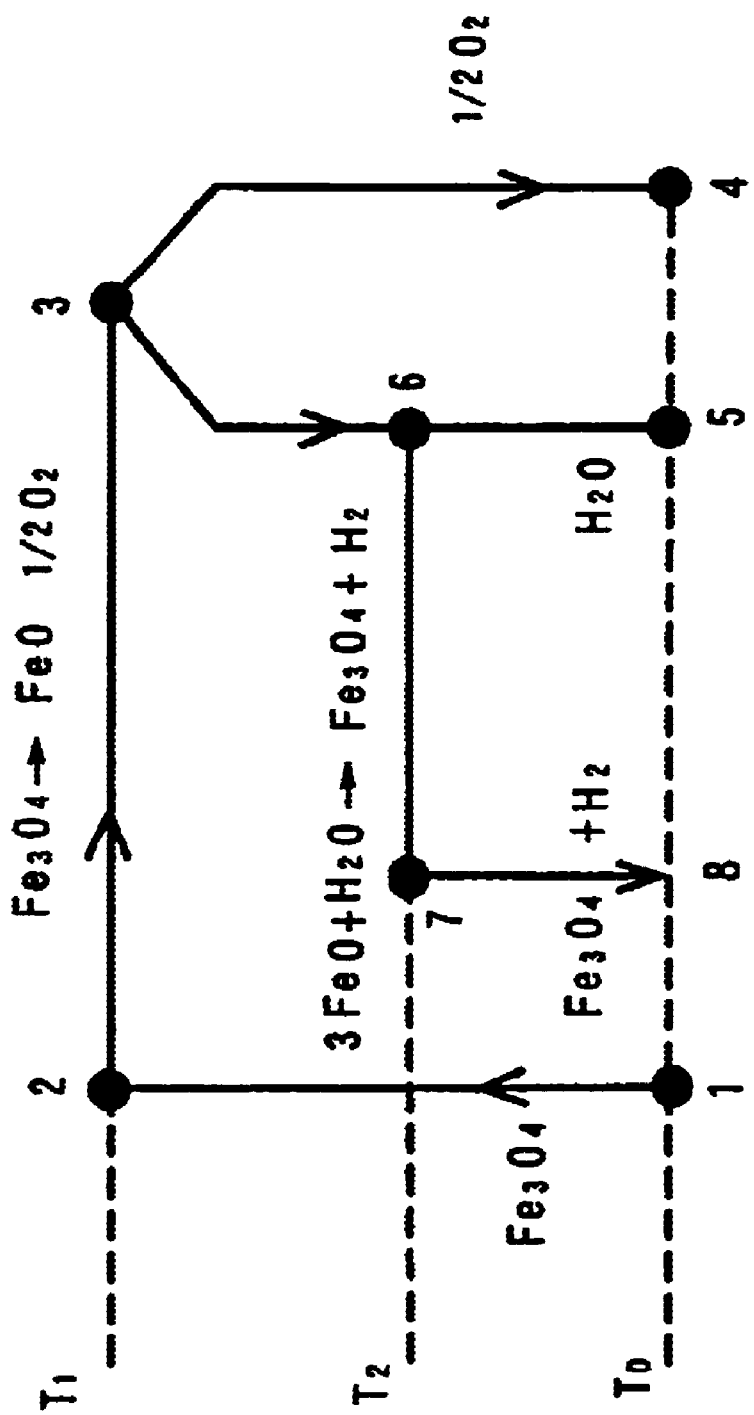
FIG. 2 is a view showing a conventional thermochemical cycle for producing hydrogen.
Figure 3:
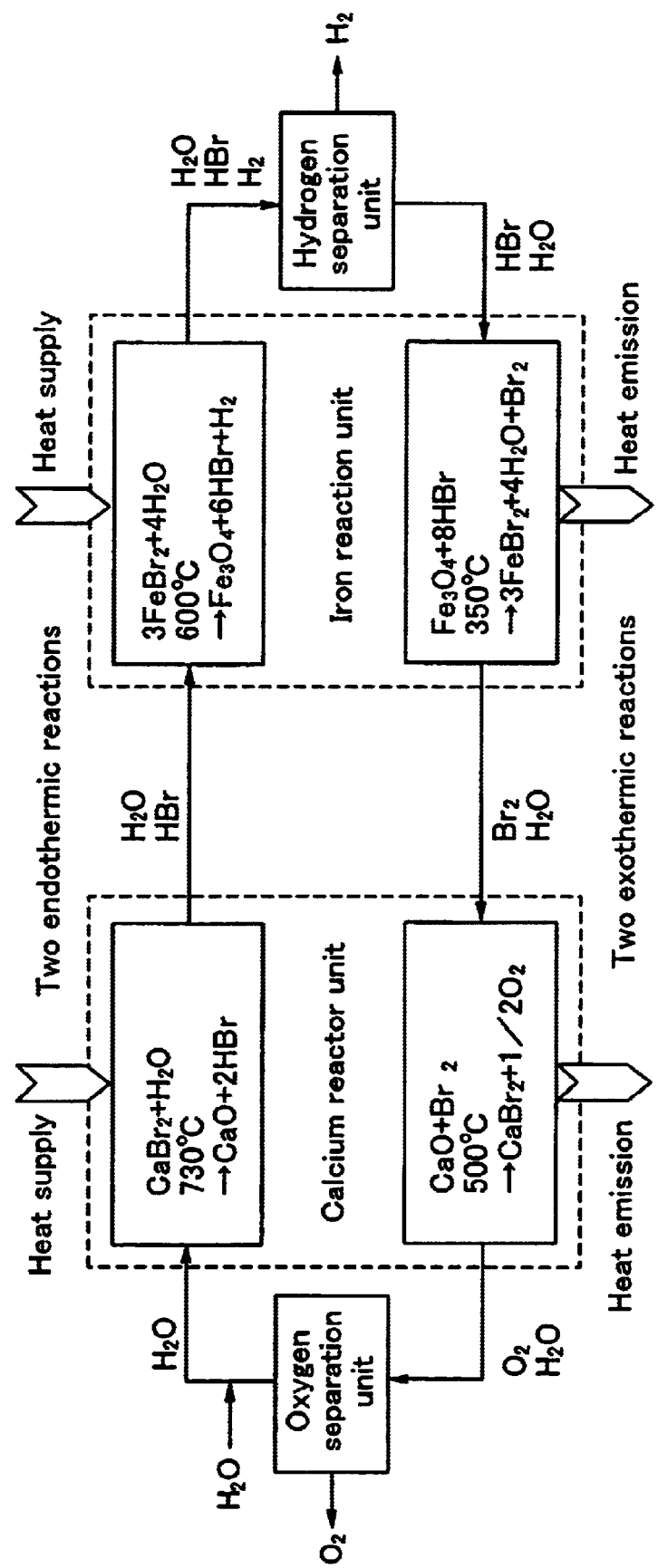
FIG. 3 a view showing another conventional thermochemical cycle for producing hydrogen.

FIG. 1 is a view showing an example of an apparatus for implementing a producing method of hydrogen gas according to the present invention, wherein $N_2$ gas as carrier gas is supplied through a flowmeter 2 to a steam generating apparatus 1. A conduit 3 for sending steam generated with the carrier gas generated by heating (80° C.) pure water is connected to the steam generating apparatus 1. In the conduit 3 are provided a separator 4, a pre-heater 5 and a mass flow controller 6. The end of the conduit 3 is connected to the bottom portion of a column type reactor vessel 7.

The reactor vessel 7 is filled with zeolite 8 which is granulated. A heater 9 is provided around the reactor vessel 7. A conduit 10 is connected to the upper end of the reactor vessel 7. A bypass 11 for collecting a sample, a pressure gauge 12 and a $N_2$ trap 13 are provided in the conduit 10. A suction pump 14 is connected to the $N_2$ trap 13.

Hereinafter, an explanation will be given on an experimental example of the present invention. However, the present invention is not limited to the experimental example.
(Experimental Example)

Natural zeolite produced in Itaya (a locality in zeolite of Japan), which has the composition shown in TABLE 1, was used. NaBr, NaF, LiCl, KCl and $MgCl_2$ were prepared as metal halide.

TABLE 1

| Components of natural zeolite produced in Itaya | |
|---|---|
| Name of component | (g/100 g) |
| $SiO_2$ | 76.6 |
| $Al_2O_3$ | 13.3 |
| $K_2O$ | 3.99 |
| $Na_2O$ | 2.64 |
| $Fe_2O_3$ | 1.49 |
| CaO | 1.39 |
| MgO | 0.211 |
| $TiO_2$ | 0.129 |
| BaO | 0.112 |
| MnO | 0.0276 |
| $Rb_2O$ | 0.0134 |
| $P_2O_5$ | 0.0114 |
| $SO_3$ | 0.048 |
| $Y_2O_3$ | trace |
| $ZrO_2$ | trace |
| SrO | trace |
| ZnO | trace |
| NiO | trace |
| $Ga_2O_3$ | trace |
| $Nb_2O_5$ | trace |
| Cl | trace |

Zeolite of 200 g having the above-mentioned composition was milled and granulated (average particle diameter: 1–3 mm) using an aqueous solution (5%) of the above-mentioned metal halide, and thereafter it was dried at a temperature of 200° C. An addition amount of metal halide was 5g with regards to natural zeolite of 100 g.

Next, the above-mentioned granulated zeolite was filled into the reactor vessel. The temperature of the reactor vessel was increased up to 500° C. after being depressurized by a vacuum pump. Steam of about 200 ml from the steam generating apparatus was introduced into the reactor vessel and the reaction was conducted for two (2) hours.

After the reaction, the produced gas was collected by a gas collecting bottle, and the components of the collected gas were analyzed by a gas chromatography. The result is shown in TABLE 2.

As is apparent from TABLE 2, by using the granulated zeolite to which metal halide is added as a catalyst, it is possible to collect gas including hydrogen gas of high concentration.

Also, as the metal halide to be added, LiCl produces the best result.

TABLE 2

| Sample | Collected Gas Components (%) | | | Collected H$_2$ Amount (ml) (Total Gas Amount = 600 ml) |
|---|---|---|---|---|
| | H$_2$ | O$_2$ | N$_2$ | |
| Zeolite only | 1.2 | 1.3 | 91.0 | 7.2 |
| Zeolite + NaBr | 2.9 | 6.6 | 89.0 | 17.4 |
| Zeolite + NaF | 1.65 | 7.92 | 68.0 | 9.9 |
| Zeolite + LiCl | 18.0 | 5.1 | 47.8 | 108.0 |
| Zeolite + KCl | 5.1 | 18.2 | 66.7 | 30.6 |
| Zeolite + MgCl$_2$ | 6.1 | 15.4 | 64.6 | 36.6 |
| Zeolite + LiCl (no granulation) | 16.3 | 7.3 | 51.0 | 97.8 |

| Reaction temperature: | 500° C. |
|---|---|
| Addition amount of metal halide: | 5 wt % |
| Granulation diameter: | 1–3 mm |

Another reaction was conducted under the conditions same as mentioned above, except for setting the reaction temperature at 300° C. The result is shown in TABLE 3. As is apparent from TABLE 3, the collected amount of hydrogen gas is decreased compared to the case of 500° C., however the concentration is sufficiently available from the viewpoint of industry.

Further, the reactions were conducted at 600° C. and 250° C. The result in the case of 600° C. is almost same as 500° C., while the yield is greatly decreased in the case of 250° C. These results show that the reaction temperature is preferable to be in the range of 300° C.–500° C.

TABLE 3

| Sample | Collected Gas Components (%) | | | Collected H$_2$ Amount (ml) (Total Gas Amount = 600 ml) |
|---|---|---|---|---|
| | H$_2$ | O$_2$ | N$_2$ | |
| Zeolite only | 1.05 | 1.8 | 93.0 | 6.3 |
| Zeolite + NaBr | 2.2 | 5.2 | 87.0 | 13.2 |
| Zeolite + NaF | 1.3 | 3.5 | 71.5 | 7.8 |
| Zeolite + LiCl | 14.8 | 8.3 | 56.2 | 88.8 |
| Zeolite + KCl | 4.6 | 3.3 | 53.3 | 27.6 |
| Zeolite + MgCl$_2$ | 5.2 | 6.8 | 68.7 | 31.2 |
| Zeolite + LiCl (no granulation) | 0.98 | 2.3 | 87.0 | 5.9 |

TABLE 3-continued

| Reaction temperature: | 300° C. |
|---|---|
| Addition amount of metal halide: | 5 wt % |
| Granulation diameter: | 1–3 mm |

Further, using LiCl which produces the best result, an experiment on the addition amount with regards to zeolite was conducted. As a result, the addition amount reached to a peak value in a case of 5 wt %. If the addition amount is less than 1 wt % or greater than 20 wt %, the yield is half (½) compared to the case of 5 wt %. Therefore, it is preferable that the addition amount be in the range of 1–20 wt %.

INDUSTRIAL APPLICABILITY

Hydrogen gas produced by the present invention can be used as fuel gas for fuel cell.

What is claimed is:

1. A method for producing hydrogen gas, comprising the steps of:

granulating zeolite;

applying water to said zeolite at the temperature equal to or greater than 300° C. and less than or equal to 500° C.; and conducting direct pyrolysis of water using said zeolite as a catalyst, wherein alkali metal halide and/or alkaline-earth metal halide is/are added to said zeolite at the time of granulating.

2. A method for producing hydrogen gas according to claim 1, wherein said alkali metal halide is LiCl.

3. A method for producing hydrogen gas according to claim 1, wherein the addition rate of said alkali metal halide and/or said alkaline-earth metal halide with regards to zeolite is in the range of 1–20 wt %.

4. A method for producing hydrogen gas according to claim 1, wherein said pyrolysis is conducted under a depressurized condition.

5. A method for producing hydrogen gas according to claim 2, wherein said pyrolysis is conducted under a depressurized condition.

6. A method for producing hydrogen gas according to claim 3, wherein said pyrolysis is conducted under a depressurized condition.

* * * * *